(12) United States Patent  
Yanai

(10) Patent No.: US 9,160,886 B2
(45) Date of Patent: Oct. 13, 2015

(54) IMAGE PROCESSING APPARATUS AND METHOD FOR CONTROLLING THE SAME

(71) Applicant: CANON KABUSHIKI KAISHA, Tokyo (JP)

(72) Inventor: Tomokazu Yanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 13/919,783

(22) Filed: Jun. 17, 2013

(65) Prior Publication Data

US 2013/0335474 A1    Dec. 19, 2013

(30) Foreign Application Priority Data

Jun. 19, 2012   (JP) .................................. 2012-137916

(51) Int. Cl.
*H04N 1/405*   (2006.01)

(52) U.S. Cl.
CPC ........... *H04N 1/40018* (2013.01); *H04N 1/405* (2013.01)

(58) Field of Classification Search
CPC ........................... H04N 1/405; H04N 1/40018
See application file for complete search history.

(56) References Cited

U.S. PATENT DOCUMENTS

| 7,355,755 | B2 * | 4/2008 | Suino et al. .................. 358/3.15 |
| 2008/0173930 | A1 | 7/2008 | Watanabe et al. |
| 2008/0186348 | A1 * | 8/2008 | Yanai et al. .................... 347/15 |
| 2008/0192267 | A1 * | 8/2008 | Watanabe ...................... 358/1.8 |
| 2008/0316554 | A1 | 12/2008 | Yanai et al. |
| 2010/0177137 | A1 * | 7/2010 | Kakutani ....................... 347/15 |

FOREIGN PATENT DOCUMENTS

| JP | 2008-182035 A | 8/2008 |
| JP | 2010-017977 A | 1/2010 |

* cited by examiner

*Primary Examiner* — Manish S Shah
*Assistant Examiner* — Jeremy Delozier
(74) *Attorney, Agent, or Firm* — Canon USA, Inc., IP Division

(57) ABSTRACT

An image processing apparatus for forming an image with a plurality of recording element arrays, grouped together on a plurality of recording heads, on a same area of a recording medium. The image processing apparatus sets recording data of each of the recording element arrays from input image data, and a halftone processing unit generates halftone image data to be recorded by each of the recording element arrays by performing halftone processing on the recording data of each of the recording element arrays, which is set by the setting unit. Halftone image data pieces corresponding to at least a pair of recording element arrays located on a same recording head are in phase with each other in a wider frequency band than halftone image data pieces corresponding to at least a pair of recording element arrays located on different recording heads.

8 Claims, 17 Drawing Sheets

IMAGE PROCESSING APPARATUS AND METHOD FOR CONTROLLING THE SAME

BACKGROUND OF THE INVENTION

1. Field of the Invention

The present disclosure relates to an image processing apparatus for forming an image with use of a long connected head constructed by connecting a plurality of recording heads, each of which includes a plurality of recording element arrays arranged substantially in parallel, in a direction of the recording element arrays, and a method for controlling the image processing apparatus.

2. Description of the Related Art

An image forming apparatus, which is used as an output apparatus for, for example, electronic apparatuses including a computer, a word processor, and the like, is configured to record an image (including a character, a symbol, and the like) on a recording medium such as a sheet. An inkjet type image forming apparatus (an inkjet image forming apparatus) forms an image by discharging ink from recording elements toward a recording medium with use of a recording head.

As one type of the inkjet image forming apparatus, there is a so-called full line type inkjet image forming apparatus, which includes a recording head having a recording width corresponding to a width of a recording medium and forms an image while involving only a movement of the recording medium in a conveyance direction. For the full line type inkjet image forming apparatus, the recording medium is set at a predetermined position, and a recording operation is performed while the recording medium is conveyed. For the recording head used in the above-described full line type image forming apparatus, it is currently difficult to process all inkjet recording elements throughout an entire width of the recording area of the recording medium without a defect. For example, realizing recording with a resolution of 1200 dpi on a sheet of an A3 size by the full line type recording apparatus requires formation of approximately 14000 recording elements (a recording width of approximately 290 mm) at the full line type recording head. Processing such a large number of recording elements entirely without a single defect involves a difficulty in manufacturing processes. Further, even if it is possible to manufacture this recording head, this manufacturing should lead to a low yield rate and a significant increase in manufacturing cost.

For the above-described reasons, a so-called connected head is proposed as the full line type recording head. The connected head is a recording head constructed by connecting a plurality of recording heads (recording chips), each of which includes a plurality of recording element arrays arranged substantially in parallel, in such a manner that recording element arrays partially overlap. The recording element arrays each include a plurality of arrayed recording elements. In other words, it is possible to realize a head extending throughout an entire width of a recording area by arranging a plurality of short recording heads so as to connect them in a direction along which recording elements are arranged.

This connected head has a problem of a high possibility of generation of a boundary streak. The boundary streak is deterioration of an image quality that is generated at a portion where ends of recording element arrays are adjacent to each other between the recording heads. This is caused due to, for example, differences in attachment and inclination between the recording element arrays, and a variation in conveyance of a recording medium. Therefore, Japanese Patent Application Laid-Open No. 2010-17977 discusses a method for controlling an exclusive relationship according to a distance between recording element arrays for a same color on different recording heads for each dot pattern to be formed by an overlap portion (a connection portion) of recording heads.

However, the method discussed in the above-described Japanese Patent Application Laid-Open No. 2010-17977 may be unable to necessarily appropriately control an exclusive relationship between dot patterns to be formed by the respective recording element arrays. This problem occurs in an image forming apparatus that uses recording heads each including a plurality of recording element arrays for a same color as the full line type recording head. In this case, the recording element arrays for a same ink exist on both a same head and a different head. Therefore, an excellent dot layout may be unable to be acquired even by controlling the exclusive relationship with use of the distance, like the method discussed in Japanese Patent Application Laid-Open No. 2010-17977. This is because the possibility of generation of a boundary streak between two recording element arrays disposed on a same head is different from that between two recording element arrays disposed on different heads.

SUMMARY OF THE INVENTION

An embodiment of the present invention is directed to an image processing apparatus capable of reducing boundary streaks when an image is formed with use of a head elongated by a configuration connecting recording heads, each of which includes a plurality of recording element arrays configured to discharge a color material of a color component.

To achieve the above-described object, an embodiment of the present invention reduces a boundary streak when an image is formed with use of a head elongated by a configuration connecting recording heads, each of which includes a plurality of recording element arrays. According to an aspect of the present invention, an image processing apparatus, for forming an image by recording of each of a plurality of recording element arrays on a same area of a recording medium with use of a recording head constructed by connecting a plurality of recording heads, each of which includes the plurality of recording element arrays configured to record a same color component, to one another in such a manner that the recording element arrays partially overlap in a direction where the recording element arrays are arranged, includes a setting unit configured to set recording data of each of the recording element arrays from input image data, and a halftone processing unit configured to generate halftone image data to be recorded by each of the recording element arrays by performing halftone processing on the recording data of each of the recording element arrays, which is set by the setting unit. Halftone image data pieces corresponding to at least a pair of recording element arrays located on a same recording head are in phase with each other in a wider frequency band than halftone image data pieces corresponding to at least a pair of recording element arrays located on different recording heads.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. Configurations of the exemplary embodiments that will be described below are only one example, and the present invention is not limited to the illustrated configurations.

Figure 1:
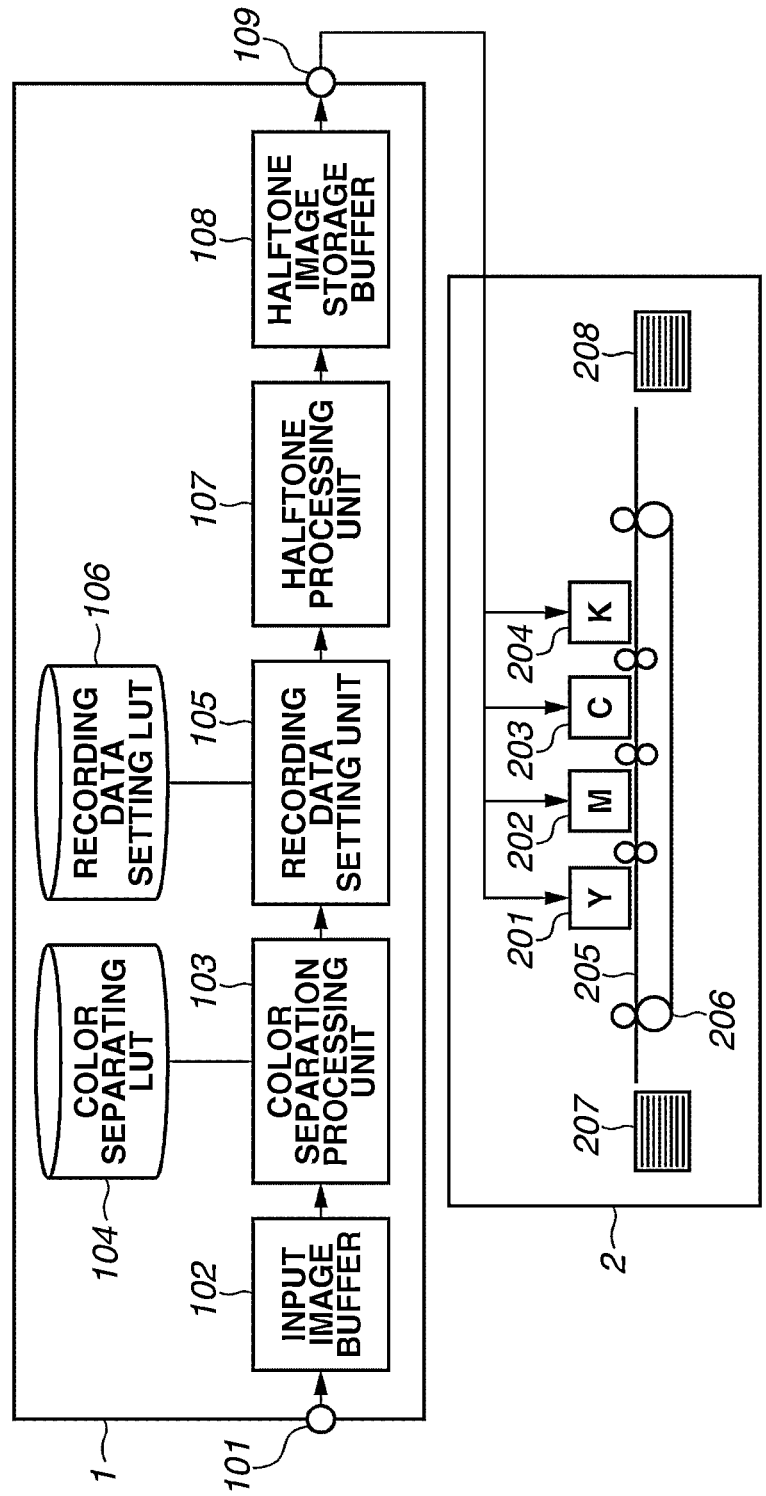
FIG. 1 is a block diagram illustrating configurations of an image processing apparatus and an image forming apparatus.

FIG. 1 is a block diagram illustrating configurations of an image processing apparatus and an image forming apparatus that are employable to a first exemplary embodiment. Referring to FIG. 1, the image processing apparatus 1 and the image forming apparatus 2 are connected via an interface or a circuit. The image forming apparatus 1 is, for example, a printer driver installed in a commonly-used personal computer. In this case, the computer executes a predetermined program, by which the respective units in the image processing apparatus 1 that will be described below are realized. However, the present exemplary embodiment may be configured in such a manner that the image forming apparatus 2 includes the image processing apparatus 1.

The image processing apparatus 1 stores color image data that is a printing target input from an input terminal 101 (hereinafter referred to as color input image data) into an input image buffer 102. The color input image data is constituted by color components of three colors, that is, red (R), green (G), and blue (B).

A color separation processing unit 103 separates the stored color input image data into image data corresponding to colors of color materials provided in the image forming apparatus 2. This color separation processing is performed by referring to a color separation look-up table (LUT) 104. In the present exemplary embodiment, the colors of the color materials are four kinds of colors, that is, cyan (C), magenta (M), yellow (Y), and black (K).

A recording data setting unit 105 further converts the image data corresponding to the color of each color material acquired from the color separation processing unit 103 into recording data of each recording element array based on a recording data setting LUT 106. In the present exemplary embodiment, the recording data is data indicating an ink amount that each recording element array prints.

A halftone processing unit 107 binarizes the recording data of each color array, which is acquired from the recording data setting unit 105, by halftone processing, and outputs binarized data (hereinafter referred to as halftone image data). The halftone processing unit 107 outputs the halftone image data for each array of each color to a halftone image storage buffer 108. The stored halftone image data is output from an output terminal 109 to the image forming apparatus 2. In a case where there is a recording element array that will record a dot pattern on a same area prior to the current target array, the halftone processing unit 107 generates the halftone image data in consideration of the dot pattern that the preceding recording element array will record. Further, the halftone processing unit 107 generates the halftone image data according to whether the preceding recording element array is located on a same recording head or a different recording head.

The image forming apparatus 2 forms an image on a recording medium 205 by controlling recording head groups 201 to 204 based on the halftone image data of each recording element array, which is received from the image processing apparatus 1, and moving the recording medium 205 relative to the recording head groups 201 to 204 at the same time. Each of the recording head groups 201 to 204 is an inkjet type recording head, and is constructed by connecting a plurality of short recording heads each having a plurality of recording element arrays for a same color. Further, a conveyance unit 206 conveys the recording medium 205 supplied from a sheet tray 207, and transmits the recording medium 205 to a print product accumulation unit 208, where the recording medium 205 becomes a print product.

Figure 2:
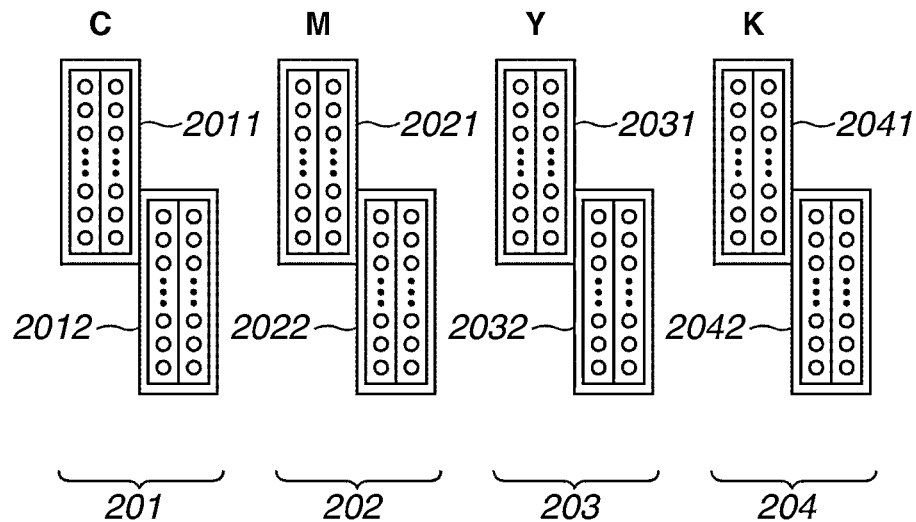
FIG. 2 illustrates configurations of a unit recording head and a recording head group.

FIG. 2 illustrates an example of configurations of the recording head groups 201 to 204. In the present exemplary embodiments, as described above, four kinds of inks, that is, cyan (C), magenta (M), yellow (Y), and black (K) are mounted on the recording head groups 201 to 204, respectively. Recording head group for each color is constructed by connecting recording chips, each of which is a recording head per unit, thereby being elongated. For example, the recording head group 201 for cyan is configured in such a manner that short recording chips 2011 and 2012, each of which has a plurality of recording element arrays for a same color, partially overlap.

In the present exemplary embodiment, each recording head groups is indicated as a recording head group in which two recording chips each having recording elements arranged in two arrays are connected relative to a direction along which the recording medium 205 is conveyed. However, the number and the layout of recording element arrays are not limited to this example. For example, each head may include three or more recording element arrays, and may be constructed by connecting three or more recording chips. Further, the recording head may be formed on a semiconductor chip or may include piezoelectric structure or microelectromechanical system (MEMS) structure.

Figure 3:
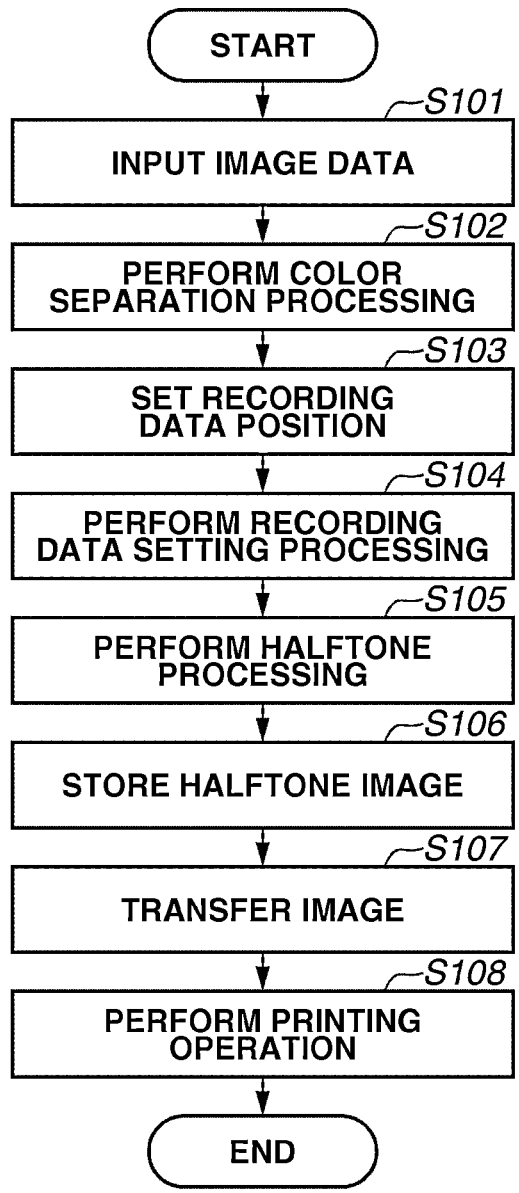
FIG. 3 is a flowchart illustrating an image processing flow by the image processing apparatus 1.

Next, processing by the image processing apparatus 1 and the image forming apparatus 2 employable to the present exemplary embodiment including the above-described functional configuration will be described with reference to a flowchart of FIG. 3.

First, in step S101, multi-gradational color input image data is input from the input terminal 101, and is stored in the input image buffer 102. As the input image data, color input image data is generated from color components of three colors, that is, red (R), green (G), and blue (B).

In step S102, the color separation processing unit 103 separates the color input image data into data for each of CMYK colors from RGB indicated by the color input image data with use of the color separation LUT 104. In the present exemplary embodiment, each pixel data after the color separation processing is processed as 8-bit data. However, the color input image data may be converted into data of a larger gradation number.

Figure 4:
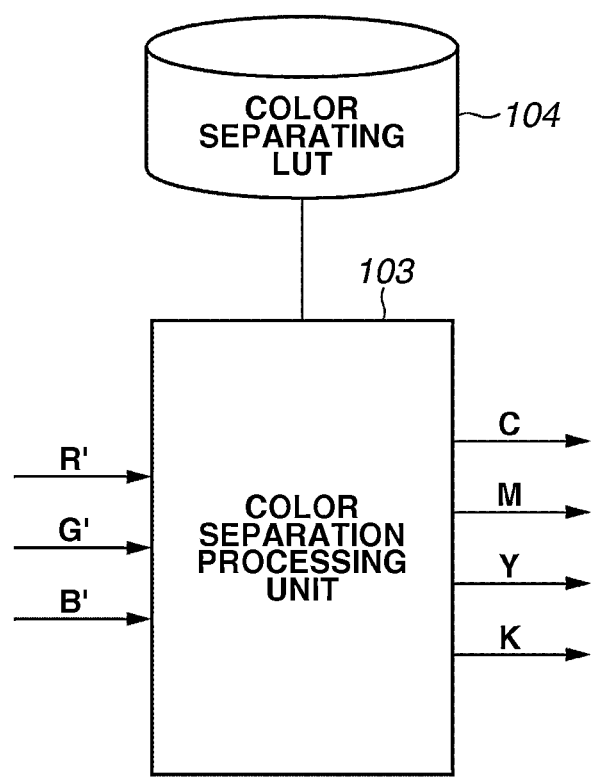
FIG. 4 illustrates a color separation processing unit 103.

As described above, the image forming apparatus 2 according to the present exemplary embodiment has four kinds of inks. Therefore, the RGB color input image data is converted into image data indicating four planes of the respective CMYK planes. FIG. 4 illustrates an input and an output of data at the color separation processing unit 103. The input image data pieces R', G', and B' of the respective colors R, G, and B are converted into color separated image data corresponding to each of CMYK colors according to the following equations by referring to the color separation LUT 104.

$$C = C\_LUT\_3D(R',G',B') \quad (1)$$

$$M = M\_LUT\_3D(R',G',B') \quad (2)$$

$$Y = Y\_LUT\_3D(R',G',B') \quad (3)$$

$$K = K\_LUT\_3D(R',G',B') \quad (4)$$

The respective functions defined at the right sides of the equations (1) to (4) correspond to the contents of the color separation LUT 104. The color separation LUT 104 defines an output value of each ink from three input values of red, green, and blue. In the present exemplary embodiment, the image forming apparatus 2 is configured to have four kinds of inks, CMYK, so that the color separation LUT 104 is configured to acquire four output values from three input values.

By the above-described processes, the color separation processing according to the present exemplary embodiment is completed. The processes of steps S103 to S108 that will be described below are performed for each color. The present exemplary embodiment will be described based on an example of cyan (C). However, similar processing is also performed for the other three kinds of color materials, magenta (M), black (K), and yellow (Y).

In step S103, the recording data setting unit 105 sets "cut (k)" which indicates a Y coordinate as a position where the color separated image data is segmented. The value "cut (k)" is a position of an array number k where the color separated image data is segmented, and corresponds to a coordinate at an upper end of recording elements in each array.

Figure 5:
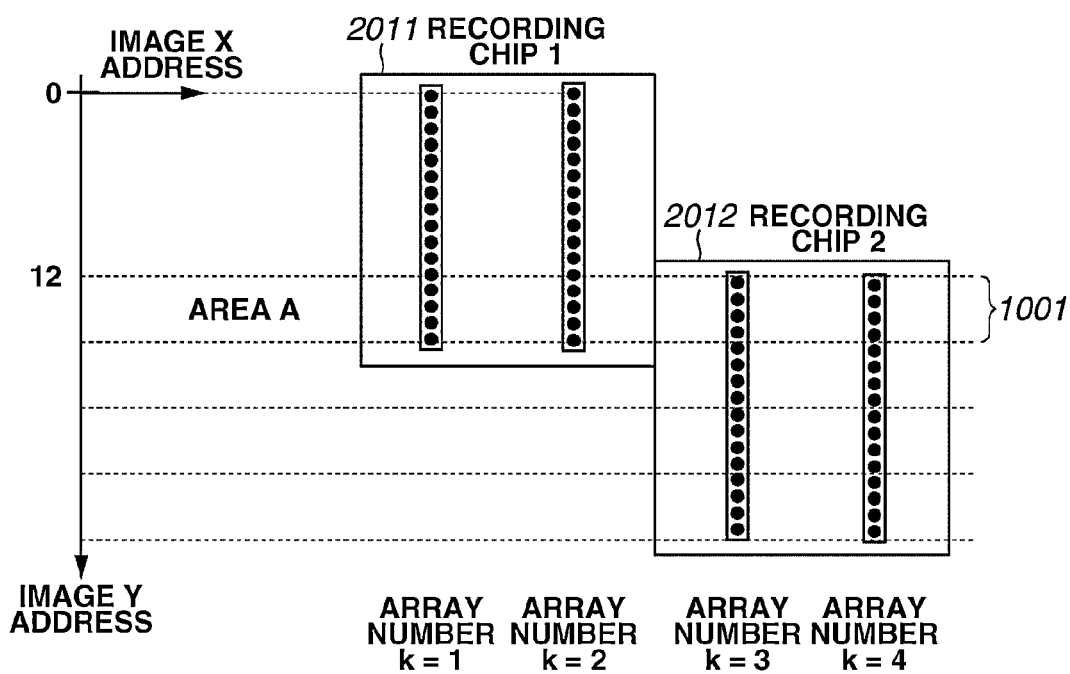
FIG. 5 illustrates a relationship between a head and an image formation area according to an array number.

For a recording element array constituted by 16 recording elements, the Y coordinate "cut (k)", as the position where the color separated image data is segmented, is set in the following manner. FIG. 5 illustrates each recording chip and an example of a segmented position according to the present exemplary embodiment. The coordinate "cut (k)" is 0 for array numbers k=1 and 2 at the recording chip 2011. The coordinate "cut (k)" is 12 for array numbers k=3 and 4 at the recording chip 2012. In this configuration, an area A corresponds to a connection portion.

After the coordinate "cut (k)" is set in this way, in step S104, the recording data setting unit 105 sets the recording data of each recording element array based on the color separated image data corresponding to each color with use of the recording data setting LUT 106.

Figure 6:
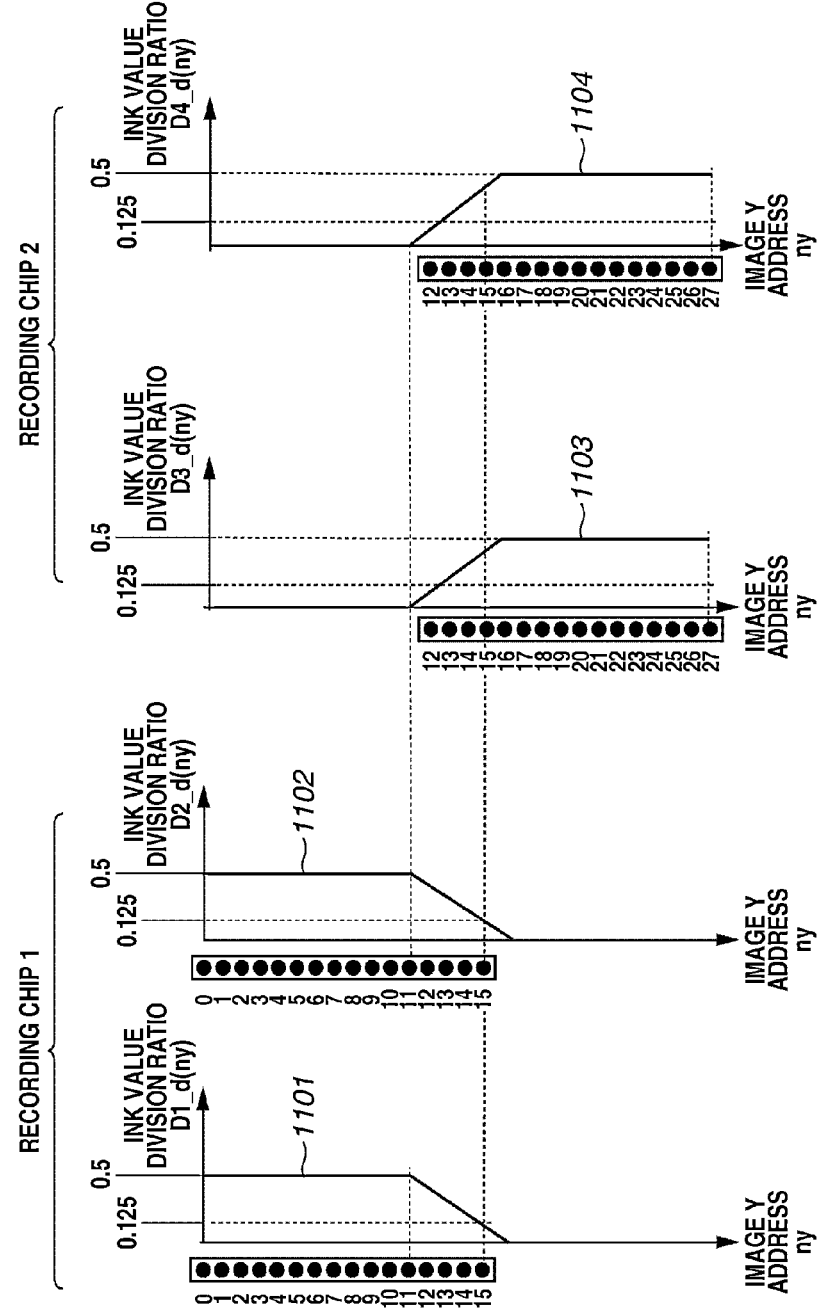
FIG. 6 illustrates a look-up table (LUT) for setting recording data.

According to the recording data setting LUT 106, for the configuration in which two recording chips each including two recording element arrays are connected to each other, values are provided as illustrated in FIG. 6. FIG. 6 illustrates the recording data setting LUT 106, in which a vertical axis represents a position of a recording element, and a horizontal axis represents an ink value division ratio. Further, the vertical axis in FIG. 6 is an image Y address position, and is set as ny. A ratio for distributing the color separated image data to each array is referred to as an ink value division ratio.

Ink value division ratios $D1\_d$ (1101), $D2\_d$ (1102), $D3\_d$ (1103), and $D4\_d$ (1104) are held as the recording data setting LUT 106, together with the respective recording element arrays. Referring to the division ratio $D1\_d$ (ny) (1101) in FIG. 6, 0.5 is set to $D1\_d$ (0) to $D1\_d$ (11), monotonically decreasing values are set thereafter, and 0.125 is set to $D1\_d$(15). The color separated image data is divided according to these ratios. Further, in FIG. 6, $D1\_d$ (ny) to $D4\_d$ (ny) at a same image Y address ny are set in the following manner.

$$D1\_d(ny)+D2\_d(ny)+D3\_d(ny)+D4\_d(ny)=1.0 \quad (5)$$

This means that, in all areas, a sum of the ink value division ratios is 1.0 for recording elements that record dot patterns on a same area, and the ink value of the color separated image data is maintained. Use of the recording data setting LUT 106 illustrated in FIG. 6 leads to formation of an image by two passes or four passes for a same area on the recording medium 205. Except for the connection portion, each area is recorded twice by two recording element arrays included in each recording chip. At the connection portion, the four recording element arrays record dot patterns four times to form an image.

Figure 7:
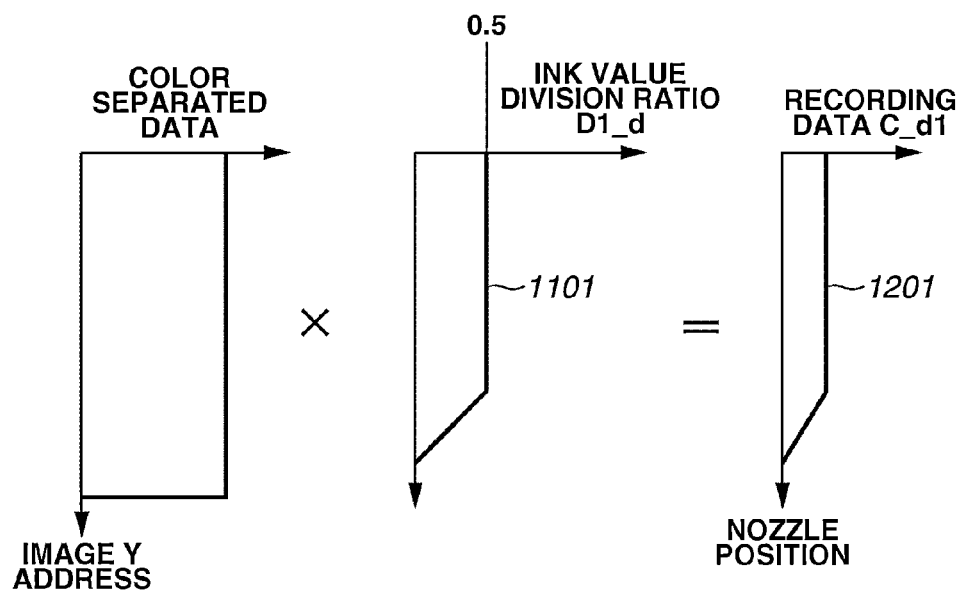
FIG. 7 illustrates processing for setting recording data.

In step S104, as illustrated in FIG. 7, the recording data setting unit 105 sets each recording data by multiplying the color separated image data by the recording data setting LUT 106. In other words, actually, the recording data is set for each recording element array, like the right side illustrated in FIG. 7. As a result, at the time of image formation, each recording element array discharges an ink amount based on the recording data to form an image.

Figure 8:
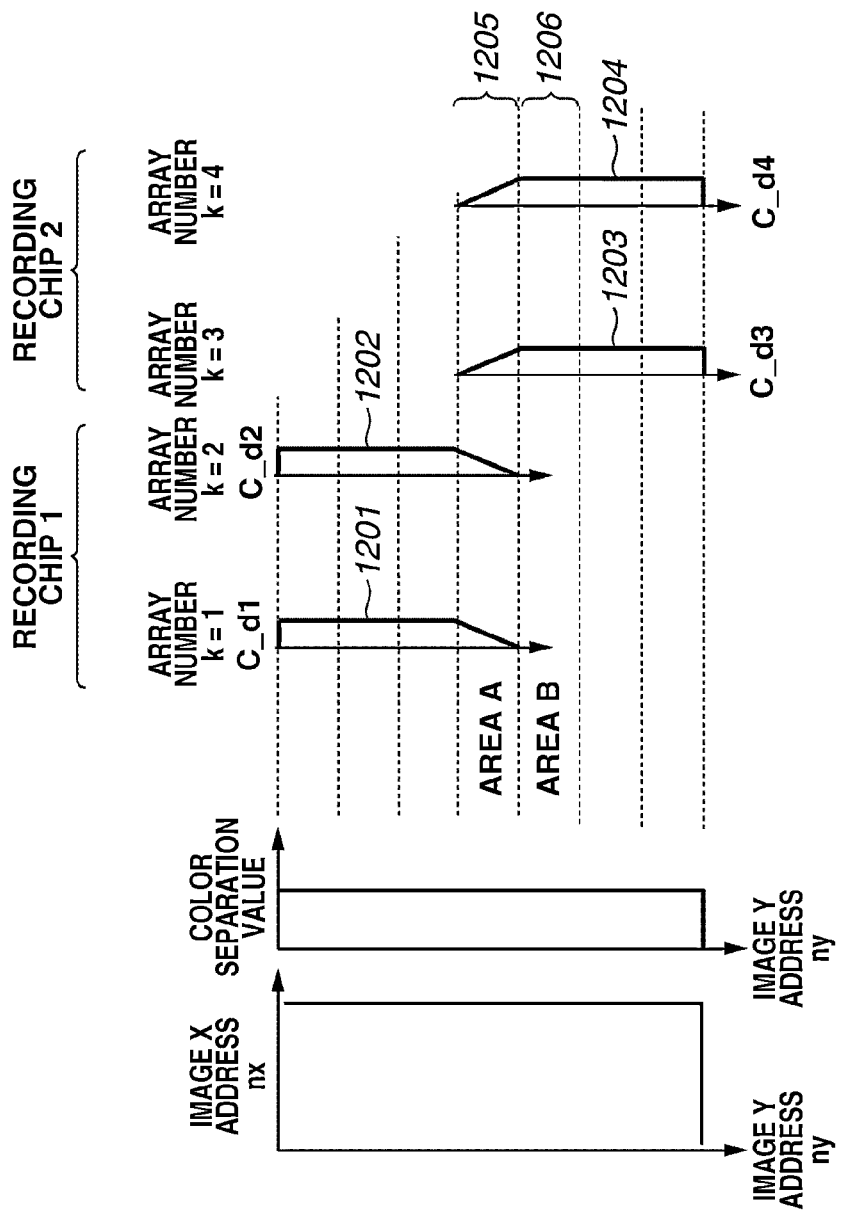
FIG. 8 illustrates recording data of each recording element array.

FIG. 8 schematically illustrates the recording data corresponding to the recording element positions of the array numbers k=1 to 4. Multi-gradational recording data is set for each array number as recording data 1201 for the array number k=1, recording data 1202 for the array number k=2, recording data 1203 for the array number k=3, and recording data 1204 for array number 4, respectively. The recording data is determined by a product of the color separated image data and the recording data setting LUT 106.

$$C\_d1(nx,ny)=C(nx,ny)\times D1\_d(ny)$$

$$C\_d2(nx,ny)=C(nx,ny)\times D2\_d(ny)$$

$$C\_d3(nx,ny)=C(nx,ny)\times D3\_d(ny)$$

$$C\_d4(nx,ny)=C(nx,ny)\times D4\_d(ny) \quad (6)$$

(In the above equations, "ny" represents an image Y address, and "nx" represents an image X address.)

However, the ink value division ratio, which is held as the recording data setting LUT 106, does not necessarily have to satisfy the equation (5), and the value may be changed at, for example, a head connection portion. For example, for a connection portion, the sum of $D1\_d$ (ny) to $D4\_d$ (ny) according to the equation (5) may be 1 or larger. Further, a value less likely to cause unevenness on an image may be acquired from an experiment, and then be provided as the ink value division ratio. Further, in the present exemplary embodiment, the ink value division ratios $D1\_d$ (ny) to $D4\_d$ (ny) are described based on an example that linearly precipitously changes. However, the ink value division ratios may change in a curved manner so as to change more smoothly.

Next, in step S105, the halftone processing unit 107 performs halftone processing, in which the halftone processing unit 107 binarizes the recording data and converts the recording data into halftone image data. The halftone image data indicates a dot pattern that each recording element array records on the recording medium 205. In the present exemplary embodiment, the halftone processing converts the 8-bit recording data into data of two gradations (1 bit) with use of the known error diffusion method. As described above, in a case where there is a recording element array that will record a dot pattern on a same area prior to the current target recording element array, the halftone processing unit 107 generates the halftone image data in consideration of the dot pattern that the preceding recording element array will record. Further, the halftone processing unit 107 generates the halftone image data according to whether the preceding recording element array is located on a same recording chip or a different recording chip. The details of the processing will be described below.

Next, in step S106, the halftone image data is stored in the halftone image storage buffer 108. In the present exemplary embodiment, the image forming apparatus 2 includes the four recording element arrays of the array numbers k=1 to 4 for each color. Therefore, as the halftone image storage buffer where the halftone image data is stored, the image processing apparatus 1 has four buffers for each color. This means that, for the CMYK four colors, the image processing apparatus 1 has 4×4=16 buffers. Further, buffers corresponding to the number of recording elements (Nzz1) in the vertical direction x a horizontal image X size (W) are secured as a buffer for each recording element array.

In step S107, band data, which is stored in the halftone image storage buffer 108, and corresponds to the number of recording elements (Nzz1) in the vertical direction and the image X size (W) in the horizontal direction, is output from the image output terminal 109. The number of output data pieces here corresponds to the number of recording element arrays x the number of colors.

In step S108, upon reception of the halftone image data, the image forming apparatus 2 selects an ink color that matches the halftone image data, and starts a printing operation. The image forming apparatus 2 discharges ink by driving each recording element at a predetermined driving interval while moving the recording medium 205 in the conveyance direction relative to the recording head groups 201 to 204, thereby recording an image on the recording medium 205. In step S108, it is determined whether the entire printing operation is completed. If the entire printing operation is completed, this means completion of a series of image forming processes. Then, the entire processing is ended.

The halftone processing performed by the halftone processing unit 107 in step S105 will be described in detail. The halftone image data corresponding to a certain recording element array (hereinafter referred to as a target recording element array) is generated in the following manner.

First, in a case where another recording element array located on a same recording chip precedes the target recording element array, dots are already formed on an area where the target recording element array will record. Therefore, the halftone processing unit 107 generates halftone image data of the target recording element array in such a manner that the halftone image data becomes exclusive relative to the dot pattern to be formed by the different recording element array located on the same recording chip in a relatively wide low-frequency band. Therefore, the resultant dot pattern is a dot pattern in which dots thereof do not so much overlap dots in the preceding dot pattern.

On the other hand, in a case where another recording element array located on a different recording chip precedes the target recording element array, the halftone processing unit 107 generates a dot pattern in such a manner that the dot pattern is in antiphase with the dot pattern to be formed by the recording element array located on the different recording chip in a low-frequency band. In this case, the resultant dot pattern is a dot pattern in which dots thereof are allowed to overlap dots in the preceding dot pattern.

In this way, the halftone processing unit 107 generates halftone image data in such a manner that dot patterns to be formed by recording element arrays located on a same recording chip are in antiphase with each other at a low frequency in a wider band compared to dot patterns to be formed by recording element arrays located on different recording chips. In other words, a degree of exclusivity between formed dots is higher between recording element arrays located on a same recording chip. As the degree of exclusivity between dots increase, the number or area of overlaps between dots reduces.

This is because layout accuracy is high between recording element arrays located on a same recording chip, and a registration error less likely occurs between recording element arrays located on a same recording chip compared to the possibility of occurrence of a registration error between recording element arrays located on different recording chips.

Figure 9:
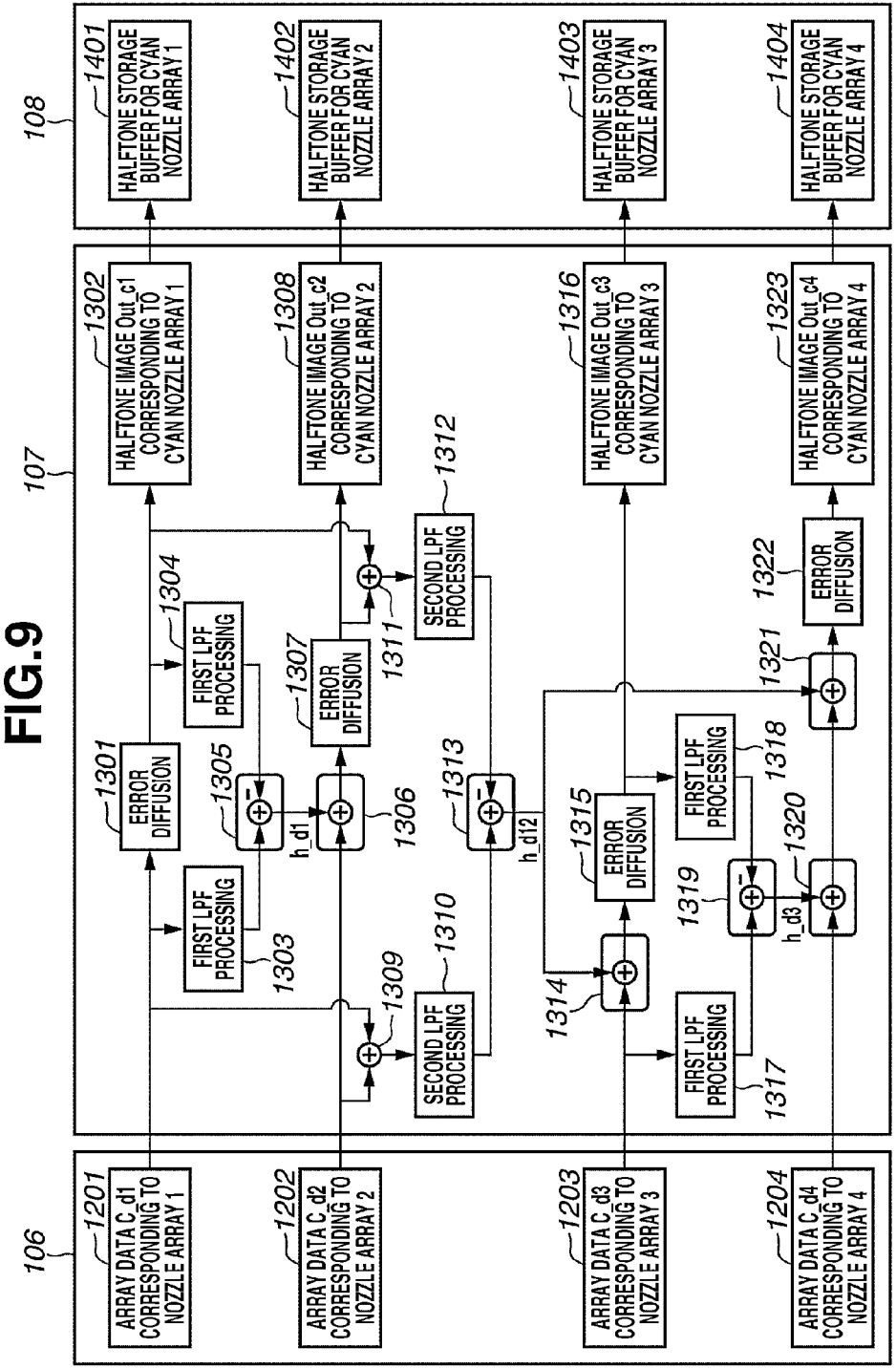
FIG. 9 is a block diagram illustrating a configuration of a halftone processing unit 107 according to a first exemplary embodiment.
Figure 10:
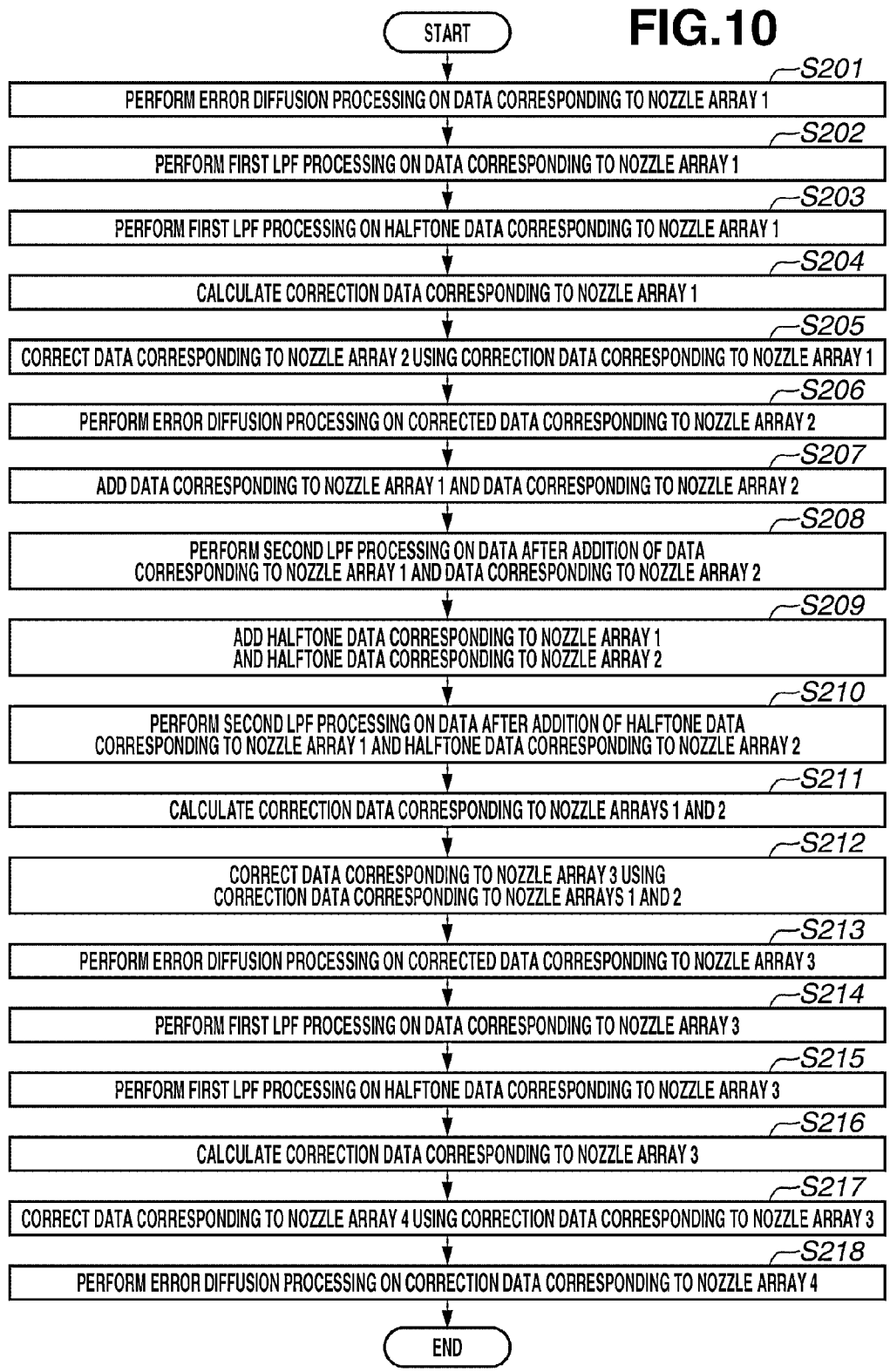
FIG. 10 is a flowchart illustrating processing by the halftone processing unit 107.

FIG. 9 illustrates a configuration of the halftone processing unit 107. Further, FIG. 10 is a flowchart illustrating a flow of the halftone processing by the halftone processing unit 107.

First, in step S201, an error diffusion unit 1301 performs error diffusion processing on the recording data $C\_d1$ (1201) of the recording element array 1. The recording data $C\_d1$ (1201) is converted into first halftone image data corresponding to the recording element array 1 of cyan. Since the error diffusion processing is known processing, the details thereof are not described here. The first halftone image Out_c1 (1302) is either 0 or 255. In a case where no dot is formed (OFF), Out_c1 is 0. In a case where a dot is formed (ON), Out_c1 is 255.

Next, in step S202, a first low-pass filter (LPF) processing unit 1303 performs filter processing on the recording data $C\_d1$ (1201) to calculate filtered data $C\_d1\_f$.

$$C\_d1\_f = C\_d1 * LPF1 \qquad (7)$$

In this equation, "*" represents convolution.

Figure 11:
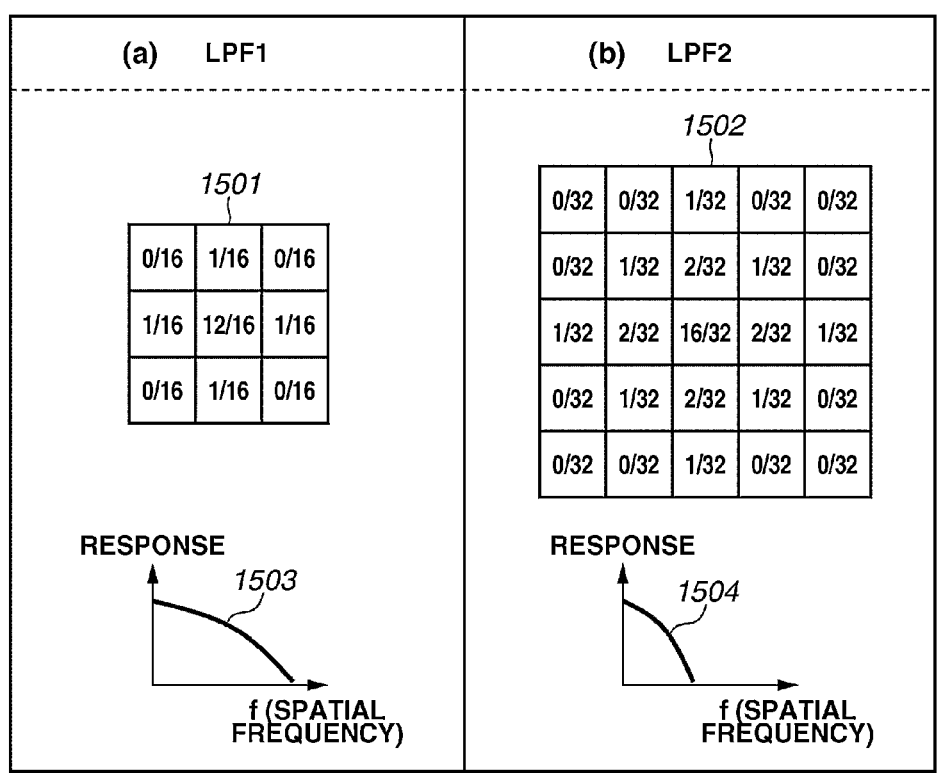
FIG. 11 illustrates low-pass filters.

This first LPF processing unit 1303 uses a filter 1501 illustrated in (a) of FIG. 11. The filter used by the first LPF processing unit 1303 may be a delta function, which does not have a low-pass characteristic (a filter coefficient is 1 only at a center, and is 0 at the others). The reason why this processing is performed in this manner will be described in detail below.

Next, in step S203, a first LPF processing unit 1304 performs the filter processing on the first halftone image data Out_c1 to calculate filtered data Out_c1_f.

$$Out\_c1\_f = Out\_c1 * LPF1 \quad (8)$$

The first LPF processing unit 1304 uses the same filter 1501 as the first LPF processing unit 1303.

Next, in step S204, a correction component calculation unit 1305 subtracts the filtered data Out_c1_f from the filtered data C_d1_f to output the difference as correction data h_d1.

$$h\_d1 = C\_d1\_f - Out\_c1\_f \quad (9)$$

Next, in step S205, a phase control unit 1306 adds h_d1 to the recording data C_d2 (1202) corresponding to the recording element array 2 to calculate corrected data C_d2_h.

$$C\_d2\_h = C\_d2 + h\_d1 \quad (10)$$

Next, in step S206, an error diffusion processing unit 1307 performs the error diffusion processing on the corrected data C_d2_h corresponding to the recording element array 2 to output second halftone image data. The second halftone image data Out_c2 (1308) also has two possible states, i.e., either 0 or 255 (binary). In other words, in a case where no dot is formed (OFF), Out_c2 is 0. In a case where a dot is formed (ON), Out_c2 is 255.

In this way, the halftone processing unit 107 forms dot patterns of the two recording element arrays located on a same recording chip. The filtered data Out_c1_f in the equation (8) is data resulting from extraction of only a low-frequency component from the first halftone image data Out_c1 with use of the filter 1501 having a low-pass characteristic. In the equation (9), a negative sign is added to the filtered data Out_c1_f to generate −Out_c1_f, and the filtered data Out_c1_f is subtracted from the low-frequency component C_d1_f of the recording data 1201 corresponding to the recording element array 1 calculated from the equation (7), thereby calculating an inverse of dots to be formed by the recording element array 1. This inverse is added to the recording data 1202 corresponding to the second recording element array, as a result of which the recording element array 2 less likely puts a dot near the dot pattern formed by the recording element array 1. In other words, this processing leads to such an effect that, at the time of processing for the recording element array 2, the halftone image data of the recording element array 2 is arranged so as to be in antiphase with the halftone image data of the recording element array 1 in the low-frequency domain. The filter 1501 is a filter allowing passage of a wide bandwidth so as to realize an antiphase state in a wide frequency band. Therefore, the degree of exclusivity is high, and dots do not so much overlap between the halftone image data of the recording element array 1 and the halftone image data of the recording element array 2.

In the equation (9), C_d1_f is added to −Out_c1_f, the purpose of which is to constantly maintain an average of h_d1 at 0 to keep the density (the number of dots) of the input image data. Further, performing the filter processing only on the filtered data Out_c1_f would lead to a difference between respective spatial frequencies when Out_c1_f and C_d1 are added to maintain an average density of 0, resulting in occurrence of edge enhancement. Therefore, edge enhancement is prevented from occurring by also filtering C_d1 by the same filter as Out_c1.

Next, in step S207, an addition unit 1309 adds the recording data C_d1 (1201) of the recording element array 1 and the recording data C_d2 (1202) of the recording element array 2 to calculate added data C_d12.

$$C\_d12 = C\_d1 + C\_d2 \quad (11)$$

Next, in step S208, a second LPF processing unit 1310 performs the filter processing on the added data C_d12 to calculate filtered data C_d12_f.

$$C\_d12\_f = C\_d12 * LPF2 \quad (12)$$

In this equation, "*" represents convolution, and "LPF2" represents a second low-pass filter.

The second LPF processing unit 1310 uses a filter 1502 illustrated in (b) of FIG. 11. The filter 1502 has a low-pass characteristic, and the bandwidth of the filter 1502 is narrower than that of the filter 1501 used by the first LPF processing units 1303 and 1304 (the filter 1502 has a strong low-pass characteristic). Further, the filter size of the filter 1502 is larger than that of the filter 1501. The reason why the filter 1502 is configured in this manner will be described in detail below.

Next, in step S209, the halftone data addition unit 1311 adds the halftone image data Out_c1 (1302) of the recording element array 1 and the halftone image data Out_c2 (1308) of the recording element array 2. Then, the halftone data addition unit 1311 calculates added halftone image data Out_c12.

$$Out\_c12 = Out\_c1 + Out\_c2 \quad (13)$$

Next, in step S210, a second LPF processing unit 1312 performs the filter processing on the added halftone image data Out_c12 to calculate filtered data Out_c12_f.

$$Out\_c12\_f = Out\_c12 * LPF2 \quad (14)$$

The second LPF processing unit 1312 uses the filter 1502.

Next, in step S211, a correction component calculation unit 1313 subtracts Out_c12_f from C_d12_f to calculate correction data h_d12.

$$h\_d12 = C\_d12\_f - Out\_c12\_f \quad (15)$$

Next, in step S212, a phase control unit 1314 adds h_d12 to the recording data C_d3 (1203) of the recording element array 3 to calculate corrected data C_d3_h.

$$C\_d3\_h = C\_d3 + h\_d12 \quad (16)$$

In step S213, an error diffusion unit 1315 performs the error diffusion processing on the corrected data C_d3_h of the recording element array 3. Third halftone image data Out_c3 (1316) of cyan, which is output data from the error diffusion processing, has two possible states, i.e., either 0 or 255 (binary) in a similar manner to the above-described halftone image data. The above-described processing results in establishment of an antiphase relationship between a dot pattern expressed by the halftone image data corresponding to the recording element array 3 and a dot pattern expressed by the halftone image data corresponding to the recording element array 2 at a low-frequency component.

Next, in step S214, a first LPF processing unit 1317 performs the filter processing on the recording data C_d3 (1203) of the recording element array 3 with use of the filter 1501 to calculate filtered data C_d3_f.

$$C\_d3\_f = C\_d3 * LPF1 \quad (17)$$

In this equation, "*" represents convolution.

Next, in step S215, a first LPF processing unit 1318 similar to the first LPF processing unit 1317 performs the filter processing on the halftone data Out_c3 with use of the filter 1501 to calculate filtered data Out_c3_f.

$$Out\_c3\_f = Out\_c3 * LPF1 \quad (18)$$

Next, in step S216, a correction component calculation unit 1319 subtracts the filtered data Out_c3_f from the filtered data C_d3_f to calculate correction data h_d3.

$$h\_d3 = C\_d3\_f - Out\_c3\_f \quad (19)$$

Next, in step S217, a phase control unit 1320 and a phase control unit 1321 adds the correction data h_d3 and h_d12 to the recording data C_d4 (1204) of the recording element array 4 to calculate corrected data C_d4_h.

$$C\_d4\_h = c\_d4 + h\_d3 + h\_d12 \quad (20)$$

Next, in step S218, an error diffusion unit 1322 performs the error diffusion processing on the corrected data C_d4_h. The fourth halftone image data Out_c4 (1323) of cyan, which is output data, has two possible states, i.e., either 0 or 255 (binary) in a similar manner to the other halftone image data. According to completion of these processes, in step S105, the halftone processing performed by the halftone processing unit 107 is completed. The halftone processing unit 107 generates the halftone image data that expresses the dot pattern to be formed by each recording element array in this way. For the recording element arrays located on a same recording chip, the degree of exclusivity relative to each other is high between the dot patterns corresponding to the respective recording element arrays. This is because the filter processing unit uses the filter allowing passage of a bandwidth including a relatively high band. On the other hand, dot patterns formed by different recording chips are in antiphase in the low-frequency band.

Figure 12:
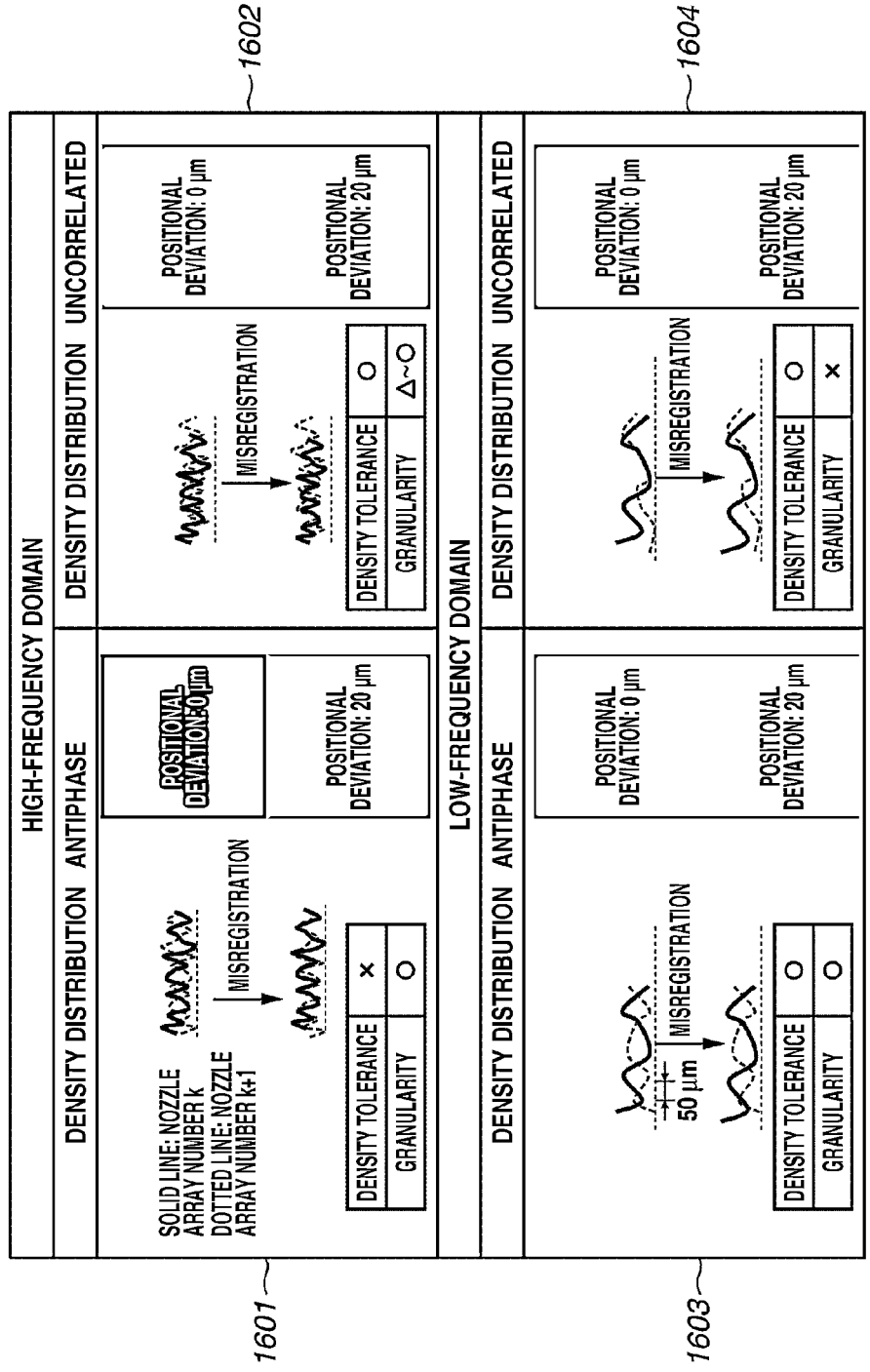
FIG. 12 illustrates a relationship between a frequency and an image quality in phase control.

FIG. 12 illustrates the reason for controlling the degree of exclusivity in this manner. FIG. 12 schematically illustrates a change in an output image that is caused by a registration error between two dot patterns, separately for each of the high-frequency domain and the low-frequency domain. FIG. 12 illustrates the change in a case where two dot patterns are arranged into antiphase with each other, and the change in a case where two dot patterns are arranged so as to be uncorrelated, in each of the frequency domains. Arranging dot patterns into antiphase with each other means forming dot patterns in an exclusive relationship with each other. Arranging dot patterns so as to be uncorrelated with each other means allowing overlaps between dots and reducing the degree of exclusivity. First, an influence of a registration error in the high-frequency domain will be described. In a case where the distribution of the dot pattern recorded by the recording element array of the array number k and the distribution of the dot pattern recorded by the recording element array of the array number k+1 are in antiphase with each other (1601), if there is no registration error, the respective dots fill a sheet surface evenly over an entire area. Therefore, the resultant image has a high density. However, if a registration error occurs, their density distributions overlap, the resultant image tends to easily show white portions of the sheet, thereby having a low density. In other words, in a case where the dot patterns are in antiphase with each other at a high-frequency component, the printed image has low density tolerance against a registration error. However, in a case where the density distributions are uncorrelated with each other at a high-frequency component (1602), even occurrence of some registration error does not easily change the density. However, in this case, granularity is slightly deteriorated.

On the other hand, regarding the low-frequency domain, in a case where the distribution of the dot pattern recorded by the recording element array of the array number k and the distribution of the dot pattern recorded by the recording element array of the array number k+1 are in antiphase with each other (1603), the resultant image has less visibly disturbing low-frequency components, and deterioration of granularity is prevented. Further, even if a registration error occurs to some degree, the density tolerance is high. However, in a case where the density distributions are uncorrelated at a low-frequency component (1604), low-frequency components appear on the image, and granularity is deteriorated, regardless of whether a registration error occurs.

In this way, in a case where it is likely that a registration error occurs on a printed image, the density tolerance can be maintained by arranging dot patterns so as to be in antiphase with each other in the low-frequency domain, and arranging dot patterns so as to be uncorrelated to each other in the high-frequency domain. On the other hand, in a case where it is unlikely that a registration error occurs, granularity can be improved by arranging dot patterns so as to be in antiphase with each other in a relatively wide frequency domain.

In a case where an image is formed with use of a head elongated by connecting the recording chips illustrated in FIG. 2, like the present exemplary embodiment, it is unlikely that a registration error occurs between recording element arrays located on a same recording chip as described above. However, it is likely that a registration error occurs between recording element arrays located on different recording chips. Therefore, dot patterns of recording element arrays located on a same recording chip are formed so as to be in antiphase with each other in a relatively wide frequency band. On the other hand, dot patterns of recording element arrays located on different recording chips are formed so as to be in antiphase with each other only in the low-frequency domain. Therefore, in the present exemplary embodiment, the filter 1501 and the filter 1502 have different low-pass characteristics. When it is desired to form dot patterns so as to be in antiphase with each other only in the low-frequency domain, a filter having a narrow bandwidth is used, as indicated by the filter 1502. As a result, when an image is formed on a recording medium using recording element arrays located on a same recording chip and recording element arrays located on different recording chips, it is possible to acquire a high-quality image with high density tolerance even if a registration error occurs.

The present exemplary embodiment has been described based on an example that adds the correction data based on the dot pattern that will be recorded before to the recording data of each recording element array. However, the method for controlling the exclusive relationship between dot patterns is not limited to the method according to the present exemplary embodiment. For example, the correction data may be reflected in a threshold value of the error diffusion method or a quantization error.

The first exemplary embodiment has been described as an example in which the halftone processing unit 107 uses the error diffusion method. A second exemplary embodiment will be described as an example in which the halftone processing unit 107 uses the dither method.

Figure 13:
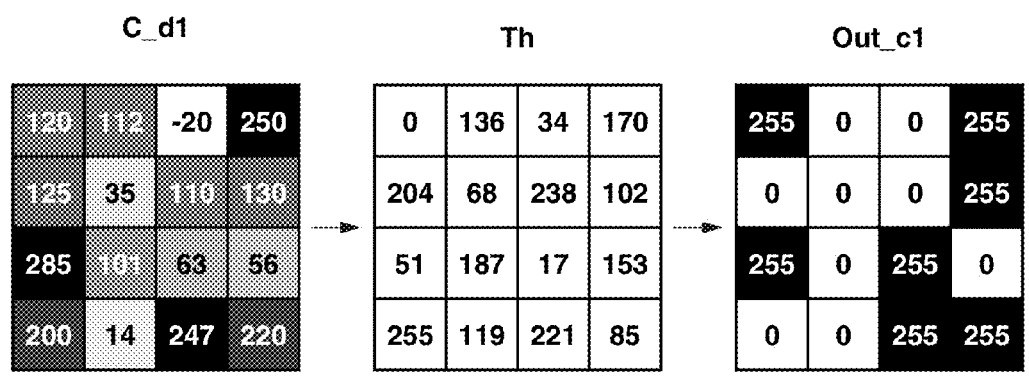
FIG. 13 illustrates an operation of dithering processing.

FIG. 13 illustrates an outline of halftone processing by the dither method, which is performed on cyan data as an example. In the dither method, input data is quantized by using a dither matrix Th constituted by threshold values corresponding to the input image data to compare the input data with the threshold values. For example, the recording data C_d1 corresponding to the recording element array 1 of cyan is compared with the dither matrix Th for each pixel. At this time, if an input pixel value is larger than the threshold value, 255 is output. If an input pixel value is smaller than the threshold value, 0 is output. As a result, halftone image data Out_c1, which will be formed by the recording element array 1 of cyan, is acquired. Therefore, it is possible to realize a configuration of the second exemplary embodiment by changing the halftone processing unit 107 according to the first exemplary embodiment illustrated in FIG. 9 to the dither method using the above-described dither matrix Th.

Figure 14:
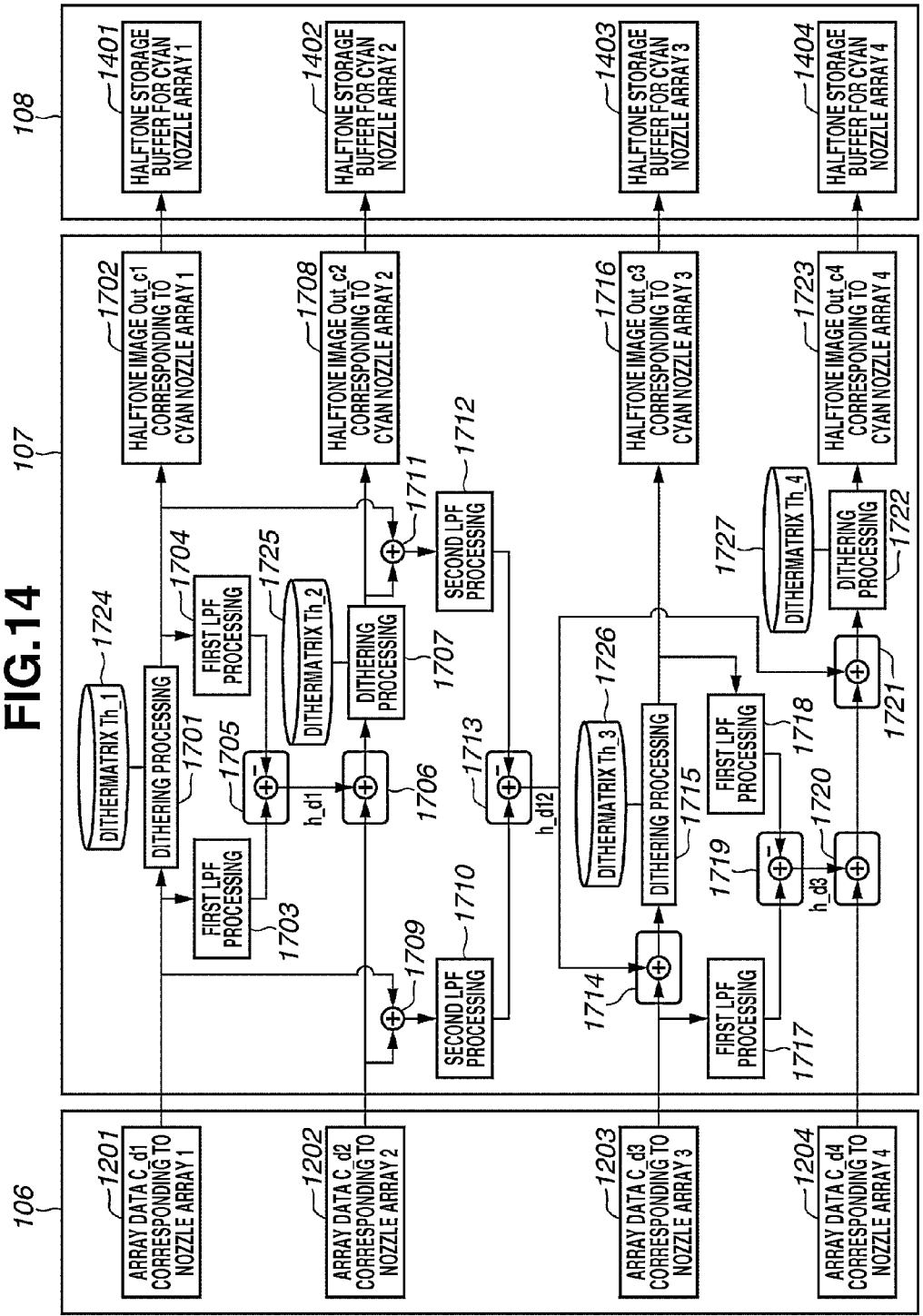
FIG. 14 is a block diagram illustrating a configuration of a halftone processing unit 107 according to a second exemplary embodiment.

More specifically, as illustrated in FIG. 14, the halftone processing unit 107 includes dithering processing units 1701,

1707, 1715, and 1722. Further, the above-described dither matrix Th is stored in the dither matrices 1724, 1725, 1726, and 1727, and the respective dithering processing units 1701, 1707, 1715, and 1722. Different dither matrices may be prepared as the dither matrix Th for the respective dithering processing units 1701, 1707, 1715, and 1722, or a same matrix may be prepared as the dither matrix Th for the respective dithering processing units 1701, 1707, 1715, and 1722. According to the above-described configuration, it is possible to acquire a similar effect to the first exemplary embodiment.

The second exemplary embodiment using the above-described dither method has been described as an example that adds correction data to the recording data of each recording element array so as to achieve an antiphase relationship. However, the correction data for achieving an antiphase relationship may be reflected in, for example, the dither matrix.

In the following description, a modification of the second exemplary embodiment of the present invention will be described. In the above-described second exemplary embodiment, when the halftone processing unit 107 uses the dither method, correction component calculation units 1705, 1713, and 1719 each calculate a correction component to form a dot pattern in antiphase. However, calculating a correction component for each recording element array increases processing cost. Therefore, the present modification will be described as an example that, when the halftone processing unit 107 uses the dither method, the above-described correction component is not calculated, and an effect equivalent to the correction is reflected in the dither matrix in advance.

Figure 15:
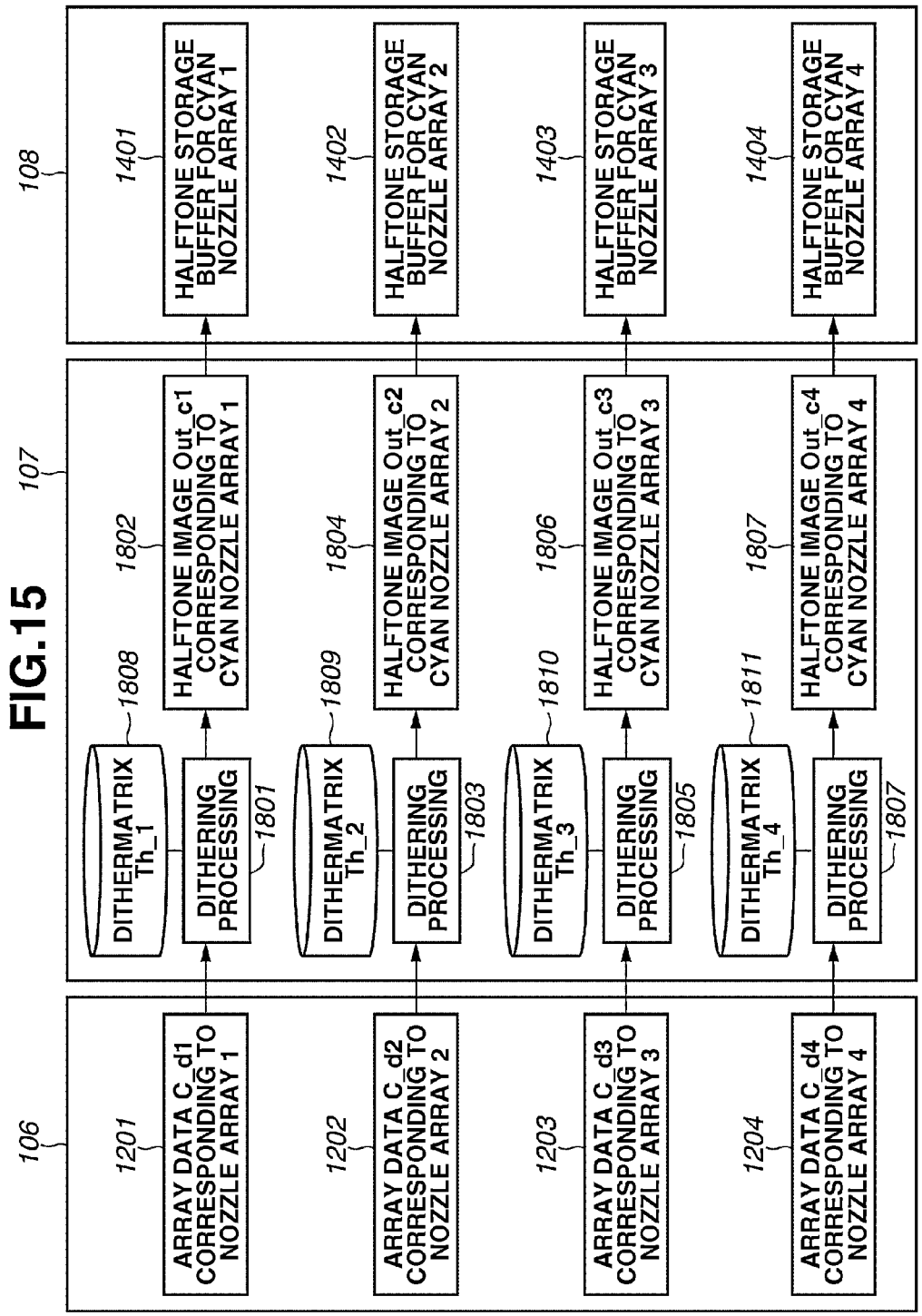
FIG. 15 is a block diagram illustrating the configuration of the halftone processing unit 107 according to the second exemplary embodiment.

FIG. 15 is a block diagram illustrating the halftone processing unit 107 that does not calculate a correction component. As illustrated in FIG. 15, dithering processing units 1801, 1803, 1805, and 1807 use dither matrices Th_1 to Th_4 (1808, 1809, 1810, and 1811), respectively. To acquire the dither matrix Th_1, a dither matrix is generated based on a known dither matrix generation method.

On the other hand, to acquire the dither matrices Th_2 to Th_4, dither matrices are generated in such a manner that dot patterns to be recorded by the respective recording element arrays are in antiphase in the low-frequency domain.

Figure 16:
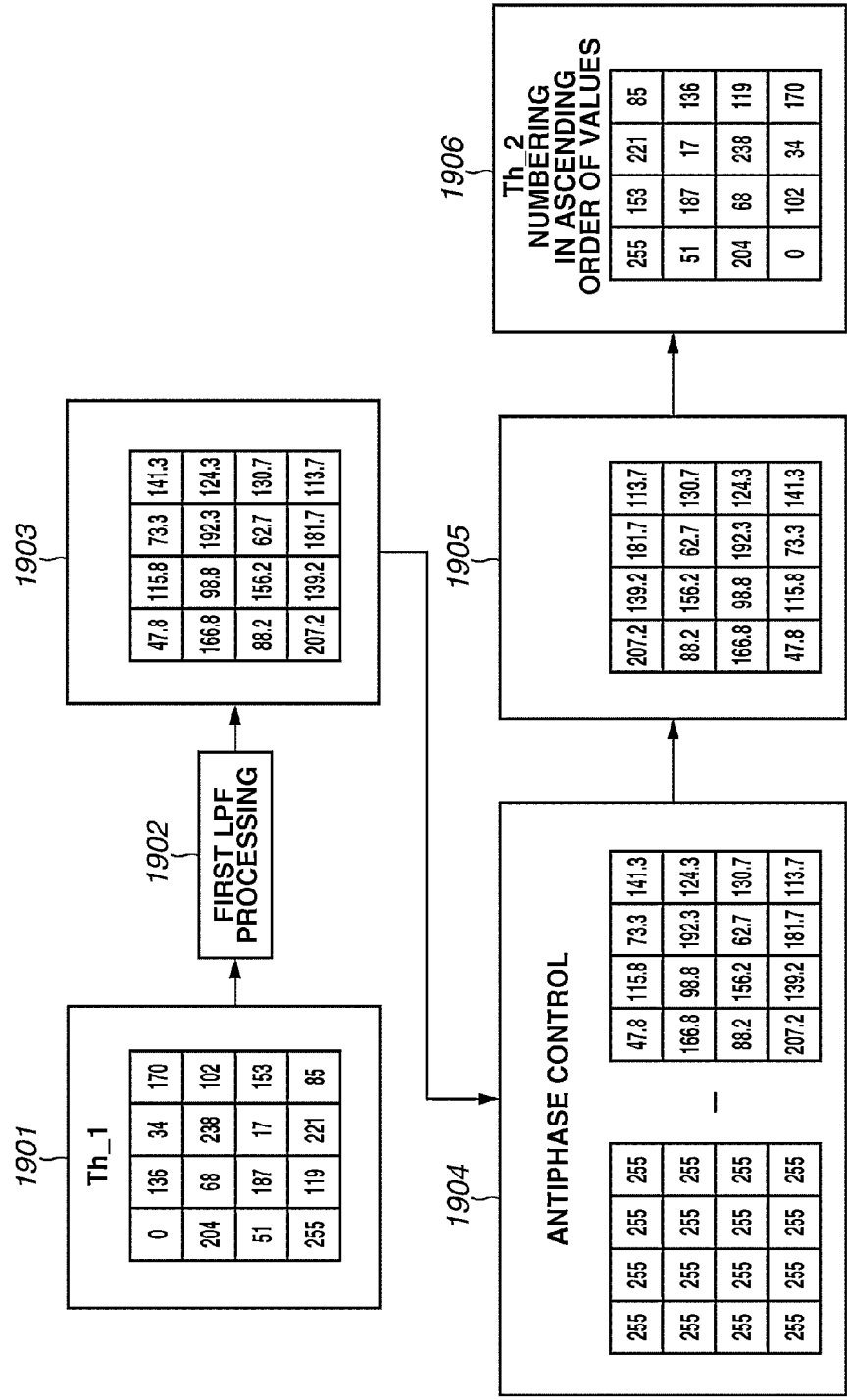
FIG. 16 illustrates generation of a threshold matrix to be used by the halftone processing unit 107 according to a modification of the second exemplary embodiment.

For example, FIG. 16 illustrates an example of generation of the dither matrix Th_2. Referring to FIG. 16, first, the filter processing is performed on the dither matrix Th_1 with use of the filter 1501 in a similar manner to the above-described exemplary embodiment to calculate a low-frequency component 1903 of the dither matrix Th_1. The filter 1501 used at this time is a filter having a wide bandwidth (a weak low-pass characteristic), thereby increasing the width of the low-frequency band where the dot patterns become an inverse of each other (antiphase with each other).

Next, a component for antiphase control is calculated based on this low-frequency component 1903 of the dither matrix Th_1. More specifically, a component for antiphase control is calculated by subtracting the low-frequency component 1903 of the dither matrix Th_1 from a pixel value group in which all pixel values are 255. Antiphase control information 1905 acquired as a result after this subtraction cannot be directly used as threshold values, so that the values of the respective pixels are converted in the form of a dither matrix.

Normally, as a dither matrix, values of 0 to 255 (in a case of 8 bits) should be stored in the form of integers. Therefore, the values of 0 to 255 are assigned to the pixel value group of the antiphase control information 1905 from a pixel having a small value. A dither matrix 1906 in FIG. 16 is illustrated as a schematic view having a size of 4×4 pixels, so that discrete numbers like 0, 17, and 34 are stored as threshold values.

However, a normal dither matrix that expresses 256 gradations or more has a size of 16×16 pixels or more, so that all values like 0, 1, 2 . . . can be stored. In this way, the dither matrix Th_2 is determined. The dither matrix Th_2 can achieve an antiphase relationship with the dither matrix Th_1 corresponding to another recording element array located on a same recording chip in a wider low-frequency band (dot patterns are in antiphase with each other in a frequency band from low frequency to high frequency). As a result, it is possible to acquire an image having excellent granularity.

Figure 17:
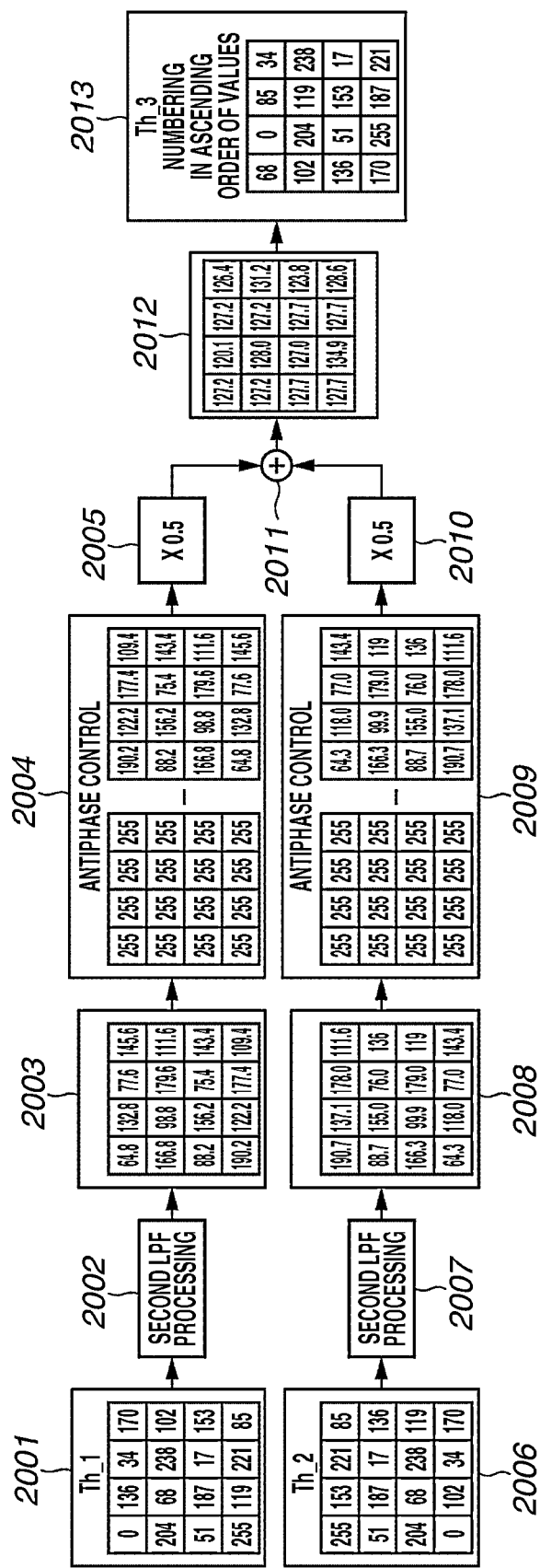
FIG. 17 illustrates generation of a threshold matrix to be used by the halftone processing unit 107 according to the modification of the second exemplary embodiment.

Further, FIG. 17 illustrates an example of generation of the dither matrix Th_3. First, the filter processing is performed on the dither matrix Th_1 (2001) with use of the filter 1502 in a similar manner to the above-described exemplary embodiment to calculate a low-frequency component 2003 of the dither matrix Th_1 (2001). The filter 1502 used at this time is a filter having a narrow bandwidth (a strong low-pass characteristic), and therefore has an effect of reducing the width of the low-frequency band where the dot patterns are in antiphase with each other.

Next, a component for antiphase control is calculated based on this low-frequency component 2003 of the dither matrix Th_1 (2001). More specifically, a component for antiphase control is calculated by subtracting the low-frequency component 2003 of the dither matrix Th_1 (2001) from the pixel value group in which all pixel values are 255. At the same time, the filter processing is also performed on the dither matrix Th_2 (2006) acquired in the above-described manner with use of the filter 1502 to calculate a low-frequency component 2008 of the dither matrix Th_2 (2006). Next, a component for antiphase control is calculated based on this low-frequency component 2008 of the dither matrix Th_2 (2006). More specifically, a component for antiphase control can be calculated by subtracting the low-frequency component 2008 of the dither matrix Th_2 (2006) from the pixel value group in which all pixel values are 255. Components 2004 and 2009 for antiphase control acquired from these processes are weighted, respectively. At this time, they are added after multiplication of the respective components 2004 and 2009 by a weight 0.5 (2005 and 2010), thereby calculating antiphase control information 2012. In a similar manner to the example illustrated in FIG. 16, the antiphase control information 2012 is converted into the form of a dither matrix.

In this way, the dither matrix Th_3 is determined. As described above, the dither matrix Th_3 is determined by performing the filter processing on the dither matrices Th_1 and Th_2 with use of the filter 1502 having a narrow bandwidth (a strong low-pass characteristic). The determined dither matrix Th_3 reduces the width of the low-frequency band in which an antiphase relationship is established with the dither matrices Th_1 and Th_2 corresponding to recording element arrays located on a different recording chip.

Although not described in detail, the dither matrix Th_4 is similar to the dither matrix Th_3 in terms that the filter processing is performed on the dither matrices Th_1 and Th_2 with use of the filter 1502 having a relatively strong low-pass characteristic to generate antiphase control information. However, in addition to that, the filter processing is performed on the dither matrix Th_3 with use of the filter 1501 having a relatively weak low-pass characteristic to generate antiphase control information. The dither matrix Th_4 can be generated with use of these two pieces of antiphase control information.

It is possible to acquire a similar effect to the above-described exemplary embodiment by performing the dithering processing with use of the dither matrices Th_1 to Th_4 generated in the above-described manner.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-137916 filed Jun. 19, 2012, which is hereby incorporated by reference herein in its entirety.

What is claimed is:

1. An image processing apparatus for forming an image by recording of each of a plurality of recording element arrays on a same area of a recording medium with use of a recording head group constructed by connecting a plurality of recording heads, each of which includes the plurality of recording element arrays configured to record a same color component, to one another in such a manner that the recording element arrays partially overlap in a direction in which the recording element arrays are arranged, the image processing apparatus comprising:

a setting unit configured to set input image data to recording data of each of the recording element arrays; and
   a halftone processing unit configured to generate halftone image data to be recorded by each of the recording element arrays by performing halftone processing on the recording data of each of the recording element arrays, which is set by the setting unit,
   wherein the halftone image data is generated so that halftone image data pieces corresponding to at least a pair of recording element arrays located on a same recording head for recording on a same area and halftone image data pieces corresponding to at least a pair of recording element arrays located on different recording heads for recording on the same area are in an antiphase with each other in a part of a frequency band, and
   wherein halftone image data pieces corresponding to at least a pair of recording element arrays located on a same recording head are in an antiphase with each other in a wider frequency band than halftone image data pieces corresponding to at least a pair of recording element arrays located on different recording heads.

2. The image processing apparatus according to claim 1, wherein the halftone image data pieces are in a same phase with each other in a frequency band where they are not in the antiphase with each other.

3. The image processing apparatus according to claim 1, wherein a frequency band where the halftone image data pieces are in the antiphase with each other is a low-frequency band.

4. The image processing apparatus according to claim 1, wherein the halftone processing is error diffusion processing.

5. The image processing apparatus according to claim 1, wherein the halftone processing is dithering processing.

6. The image processing apparatus according to claim 1, wherein the image processing apparatus is included in an inkjet type recording apparatus.

7. A method for controlling an image processing apparatus for forming an image by recording of each of a plurality of recording element arrays on a same area of a recording medium with use of a recording head group constructed by connecting a plurality of recording heads, each of which includes the plurality of recording element arrays configured to record a same color component, to one another in such a manner that the recording element arrays partially overlap in a direction in which the recording element arrays are arranged, the image processing apparatus including a setting unit and a halftone processing unit, the method comprising:

causing the setting unit to set input image data to recording data of each of the recording element arrays; and
   causing the halftone processing unit to generate halftone image data to be recorded by each of the recording element arrays by performing halftone processing on the recording data of each of the recording element arrays, which is set by the setting unit,
   wherein the halftone image data is generated so that halftone image data pieces corresponding to at least a pair of recording element arrays located on a same recording head for recording on a same area and halftone image data pieces corresponding to at least a pair of recording element arrays located on different recording heads for recording on the same area are in an antiphase with each other in a part of a frequency band, and
   wherein halftone image data pieces corresponding to at least a pair of recording element arrays located on a same recording head are in an antiphase with each other in a wider frequency band than halftone image data pieces corresponding to at least a pair of recording element arrays located on different recording heads.

8. A computer-readable storage medium storing a computer program for causing a computer to function as the image processing apparatus according to claim 7 by being read and executed by the computer.

* * * * *